A. CZYZYK.
FURNITURE CASTER.
APPLICATION FILED FEB. 13, 1920.

1,337,344.

Patented Apr. 20, 1920.

Inventor
A. Czyzyk
By A. M. Wilson
Attorney

UNITED STATES PATENT OFFICE.

ANDREW CZYZYK, OF GRAND RAPIDS, MICHIGAN.

FURNITURE-CASTER.

1,337,344.      Specification of Letters Patent.      Patented Apr. 20, 1920.

Application filed February 13, 1920. Serial No. 358,526.

*To all whom it may concern:*

Be it known that I, ANDREW CZYZYK, a citizen of Poland, residing at Grand Rapids, in the county of Kent and State of Michigan, have invented certain new and useful Improvements in Furniture-Casters, of which the following is a specification.

This invention relates to certain new and useful improvements in furniture casters and is particularly adaptable for use in connection with the legs of tables, beds or the like in the usual and well known manner.

The principal object of the present invention is to provide a furniture caster which embodies a spherical supporting or floor engaging member, a cage having anti-friction members bearing upon the upper portion of the spherical member and means to adjust said cage vertically so as to maintain the spherical member spaced from its similarly shaped socket even though wear takes place with respect to both the spherical member and anti-friction members.

Another object of the invention is to provide a caster of the above type which is bodily attachable to or detachable from a leg of an article of furniture or the like and which is of such durable construction as to insure long continued use thereof.

Other objects will appear as the nature of the invention is better understood, and the same consists in the novel form, combination and arrangement of parts hereinafter more fully described, shown in the accompanying drawing and claimed.

Figure 1:
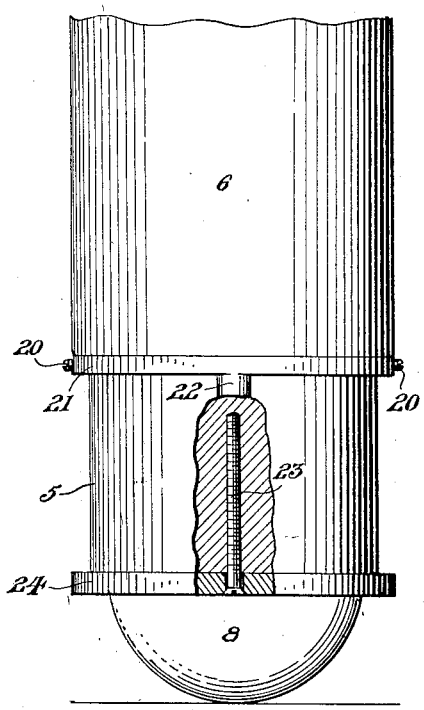
Figure 2:
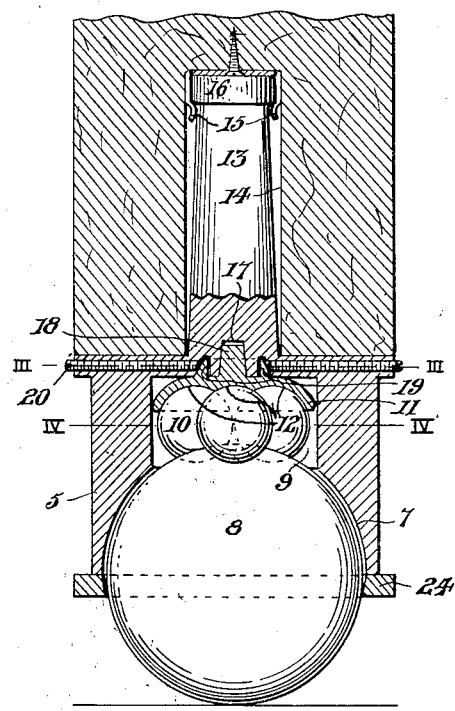

In the drawing wherein like reference characters indicate corresponding parts throughout the several views, Figure 1 is an elevational view of the lower portion of a leg of an article of furniture and equipped with a device constructed in accordance with the present invention, said device being shown and partly broken away, Fig. 2 is a substantially central vertical sectional view of the device shown in Fig. 1.

Figure 3:
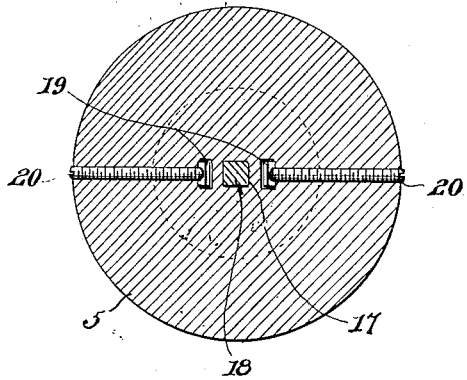
Figure 4:
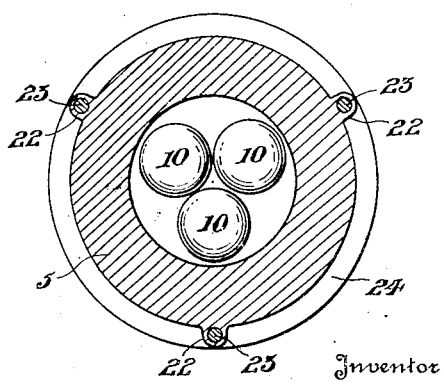
Figure 5:
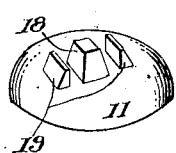

Fig. 3 is a transverse sectional view taken substantially upon line III—III of Fig. 2, Fig. 4 is a view similar to Fig. 3 taken upon line IV—IV of Fig. 2, and Fig. 5 is a perspective view of the cage or retainer for the anti-friction members.

Referring more in detail to the several views, the present invention embodies a body 5 which is preferably of the same form as the leg 6 with which it is used, and which is hollow in its central portion so as to provide a substantially hemispherical socket 7 within which the upper half or portion of the spherical supporting or floor engaging member projects, and a chamber 9 above the socket 7 for receiving the anti-friction members 10 and the cage or retainer 11 thereof.

As shown clearly in Figs. 2, 3 and 5 particularly, the anti-friction members 10 are also preferably spherical but smaller than the member 8 and rest upon the member 8 at different points of the upper portion thereof. The retainer or cage 11 is substantially of inverted cup-shape or form and provided in its under surface with a plurality of concavities 12, each adapted to accommodate one anti-friction member 10.

A shank 13 projects upwardly from the central portion of the body 5 and is adapted to be retained in the socket 14 of the leg 6 by engagement of the spring arms 15 which engage the enlarged head 16 thereof, said spring arms 15 being formed on a bracket rigidly secured in the upper end of the socket 14. A socket 17 is formed in the bottom of the stem or shank 13 for sliding reception of the central stud 18 provided on the upper side of the retainer 11 so as to allow vertical movement of the latter relative to the body 5 and parts rigid or integral therewith. The stud 18 and the socket 17 are preferably of angular formation so as to hold the cage or retainer 11 against rotation. A pair of studs 19 project upwardly from the retainer 11 at opposite sides of the central stud 18 and have inclined outer faces which are engaged by the inner ends of a pair of oppositely disposed radial screws 20 which are threaded into apertures provided in the body 5 adjacent the upper end thereof. The screw 20 may be provided with slots in the outer ends thereof so that the same may be turned by the use of a screw-driver, and it will be seen that when said screws 20 are threaded inwardly toward each other, the same engage the inclined faces of the studs 19 for effecting a slight downward movement or adjustment of the cage or retainer 11. This will simultaneously move the anti-friction members 10 and the spherical member 8 downwardly relative to the body 5 so as to adjust the member 8 in spaced relation to the socket 7. This insures a minimum amount of friction between the body 5 and the member 8 and enables one to maintain this minimum friction by adjustment from time to time as the members 10 and 8 wear.

The body member 5 is provided with an annular flange 21 at its upper end, and a plurality of vertical ribs 22 extend downwardly from said flange 21 at regular intervals about the periphery of the body 5. These ribs 22 are provided with threaded sockets open at the lower end of the body 5 and adapted for reception of the screws 23 which are provided to fasten the ring 24 against the lower end of the body 5, said ring 24 being provided to retain the spherical member 8 in the socket 7 or against accidental displacement therefrom. It will thus be seen that the ring 24 must be detached before the members 8, 10 and 11 can be removed from the body 5.

From the foregoing description it is believed that the construction and operation as well as the advantages of the present invention will be readily understood and appreciated.

Minor changes may be made in the various parts and in the combination and arrangement thereof without departing from the spirit and scope of the invention as claimed.

What I claim is:—

1. In a furniture caster, a body member adapted for attachment to an article of furniture and hollow in its central portion to provide a substantially hemispherical socket at its lower end with a chamber thereabove, anti-friction members within said chamber, a spherical member disposed with its upper portion within said socket and with said anti-friction members bearing thereon, and means to adjust said anti-friction members upwardly or downwardly relative to the body for regulating the relationship of the spherical member with its socket.

2. In a furniture caster, a body member adapted for attachment to the lower end of the leg of an article of furniture or the like and provided in its lower end with a substantially hemispherical socket, said body having a chamber above said socket, a spherical supporting member having its upper portion disposed in said socket, anti-friction members bearing upon the upper portion of said spherical supporting member, a retainer for said anti-friction members, and means to adjust said retainer vertically relative to the body member for regulating the space between the spherical supporting member and its socket.

3. In a furniture caster, a body member adapted for attachment to the lower end of the leg of an article of furniture or the like and provided in its lower end with a substantially hemispherical socket, said body having a chamber above said socket, a spherical supporting member having its upper portion disposed in said socket, anti-friction members bearing upon the upper portion of said spherical supporting member, a retainer for said anti-friction members, means to adjust said retainer vertically relative to the body member for regulating the space between the spherical supporting member and its socket, said last named means including a lug projecting upwardly from said retainer and having an inclined face, and a screw having its inner end bearing upon the inclined face of said stud and threaded transversely into the body member.

4. In a furniture caster, a body member adapted for attachment to the lower end of the leg of an article of furniture or the like and provided in its lower end with a substantially hemispherical socket, said body having a chamber above said socket, a spherical supporting member having its upper portion disposed in said socket, anti-friction members bearing upon the upper portion of said spherical supporting member, a retainer for said anti-friction members, means to adjust said retainer vertically relative to the body member for regulating the space between the spherical supporting member and its socket, said last named means comprising a pair of studs projecting upwardly from said retainer and having outer inclined faces, and radial screws threaded into the body member and each having its inner end bearing upon the inclined face of one of the studs.

In testimony whereof I affix my signature.

ANDREW CZYZYK.